United States Patent [19]
DeRoule et al.

[11] Patent Number: 5,580,076
[45] Date of Patent: Dec. 3, 1996

[54] AUTOMATIC TRAILER HITCH SYSTEM

[76] Inventors: Yvonne H. DeRoule; Nanette Y. Poncini, both of P.O. Box 1135, Banning, Calif. 92220-0008

[21] Appl. No.: 115,982

[22] Filed: Sep. 1, 1993

[51] Int. Cl.⁶ ........................................ B60D 1/24
[52] U.S. Cl. .................... 280/406.2; 280/416.1; 280/422; 280/491.5; 280/508
[58] Field of Search ............... 280/406.1, 406.2, 280/405.1, 407, 407.1, 415.1, 416.1, 416.3, 420, 422, 477, 491.1, 491.5, 504, 508, 509, 514

[56] References Cited

U.S. PATENT DOCUMENTS

| | | | |
|---|---|---|---|
| 2,062,788 | 12/1936 | Jacob | 280/477 |
| 2,952,475 | 9/1960 | Reese | 280/406.2 |
| 3,271,050 | 9/1966 | Saunders | 280/416.1 X |
| 3,490,788 | 1/1970 | Mann | 280/406.1 |
| 3,649,046 | 3/1972 | Mathisen | 280/406.2 |
| 4,213,627 | 7/1980 | Thompson | 280/406.2 |
| 4,230,333 | 10/1980 | Persyn | 280/406.2 |
| 4,253,680 | 3/1981 | Albright et al. | 280/406.2 X |
| 4,348,035 | 9/1982 | Wasservogel | 280/422 X |
| 4,560,184 | 12/1985 | Williams, Jr. | 280/508 X |
| 4,606,549 | 8/1986 | Williams, Jr. | 280/477 |
| 4,613,149 | 9/1986 | Williams, Jr. | 280/508 |
| 4,666,177 | 5/1987 | Vinchattle | 280/477 |
| 4,722,542 | 2/1988 | Hensley | 280/456.1 X |
| 4,759,564 | 7/1988 | Williams, Jr. | 280/508 X |
| 4,815,752 | 3/1989 | Young et al. | 280/406.2 |
| 4,844,497 | 7/1989 | Allen | 280/477 |
| 5,375,867 | 12/1994 | Kass et al. | 280/407 X |

*Primary Examiner*—Kevin Hurley

[57] ABSTRACT

A fully integrated, three-stage automatic weight distributing hitching system for a trailer and towing vehicle which utilizes a funnel-shaped receiver system (100), a head assembly (D) with elongated shank (160), spring bars (C) and chains (B), and a motorized electromechanical screw-driven piston device (382). The receiver, mounted on the Pear of the towing vehicle, is equipped with spring loaded dogs (140) which drop into machined recesses (240) of the shank when shank is inserted into the receiver, locking the shank in place and creating a secure coupling of the trailer and the towing vehicle. Solenoids (120) are affixed to the outside of the receiver and, when activated, will retract the spring-loaded dogs from the shank, and allow for uncoupling. The forward end of the receiver is fitted with a male portion of an electrical plug (180). The pivotable head assembly with ball (E) and shank extends from the trailer tongue (A). A tunnel (170) has been machined out along the length of the shank to house a cord (280) and a female portion of an electrical plug (220) which mates with the male plug in the receiver when inserted, and provides instant automatic connection of the electrical system between the trailer and the towing vehicle. The piston device is transversely mounted on the trailer tongue. Triangular cams (366) affixed to the ends of the piston device, cam support brackets (364) mounting brackets (350), and draw chains (B) produce tension and load-transferring capabilities of the spring bars when cams are rotated upward. These cams, when rotated downward, release the tension on the bars.

5 Claims, 9 Drawing Sheets

AUTOMATIC TRAILER HITCH SYSTEM

BACKGROUND

1. Field of Invention

This invention relates to trailer hitches, specifically to the method of connecting and disconnecting a trailer to a towing vehicle.

2. Description of Prior Art

Previous to our invention, most trailer hitches were designed in such a way that they required a significant amount of manual intervention to operate.

In most known prior art hitches, the method for facilitating coupling was a receiving unit with an alignment hole, mounted to the rear underside of the towing vehicle, which accepted a shank portion of a head assembly. The head assembly comprised a protruding shank with a corresponding hitch pin hole and a ball mount with a ball. The shank portion of the head assembly was manually inserted into the receiver, aligned, and affixed by means of a hitch pin. The towing vehicle was then backed up to the trailer, which was supported by a leveling jack. The towing vehicle was maneuvered until the ball of the head assembly was aligned under the ball socket of the trailer tongue, then the tongue was lowered, and the ball socket was manually locked and the units were coupled.

An electrical cord was then manually connected between the two vehicles to supply electrical power from the towing vehicle to the trailer, for turn signals, running, brake, and backup lights, and to keep the battery of the trailer charged.

In weight distributing hitch systems, spring bars were used to provide proper load transference between the towing vehicle and the trailer by use of tensional force. The forward ends of the spring bars were inserted into spring bar sockets of the head assembly and were rotated rearwardly. The rearward ends of the spring bars had chains welded to their topside which were pulled upward and placed onto a hook which was part of a bracket clamped to the rearward end of the trailer tongue frame. To obtain proper tension and load-transferring capabilities, the chains were tensioned by a hookup handle manually pushed onto the end of the hook and forced upward. This raised the chains and increased stress on the spring bars which equally distributed the weight of the trailer to the towing vehicle. The brackets and chains were locked into place and secured by a wire retaining clip.

To disconnect, the leveling jack was lowered to support the weight of the trailer. The wire retaining clip was then disengaged. The hookup handle was manually pushed onto the chain hook of the bracket and pulled downward to release the chains, thereby relaxing the tension on the spring bars. The chains were then removed from the chain hook of the bracket and the spring bars were rotated forwardly and dropped out of the head assembly. The ball socket of the trailer tongue was unlocked and the trailer was raised slightly by use of the leveling jack, exposing the ball. The electrical cord was manually disconnected from the towing vehicle, leaving the towing vehicle free to move forward. The hitch pin was pulled from the receiver and the head assembly was removed and stored with the spring bars.

U.S. Pat. No. 2,062,788 to Jacob, Dec. 1, 1936 shows a hitch with a pair of swinging latch and lock dogs affixed to the trailer tongue frame for engagement with a ball-mounted probe on the towing vehicle. In order to couple trailer and towing vehicle, a manual, four-step procedure was required for moving the dogs to a released position, to an automatic latching position, and to a positive locking position. A manual procedure was also required in order to uncouple the units. The electrical connection between the trailer and the towing vehicle was done manually. There was no accommodation for weight distribution.

U.S. Pat. No. 2,952,475 to Reese, Sep. 13, 1960 shows a hitch with a weight distributing (load transferring) system using spring bars, draw chains, and hookup brackets. There were no accommodations for automatic coupling. The heavy head assembly had to be manually lifted and its shank manually inserted into the receiver. A hitch pin had to be inserted through an opening in the receiver and the shank to secure the shank within the receiver. The chains, attached to the hookup brackets, had to be manually drawn up to an over-center position to properly tension the spring bars. The hookup brackets were locked in place by use of a retaining clip. All hardware had to be manually released, removed, and stored. The electrical connection between the trailer and the towing vehicle was done manually.

U.S. Pat. No. 3,649,046 to Mathisen, Mar. 14, 1972 shows a hitch with weight distributing spring bars; however, the spring bars had to be attached and detached manually. The heavy head assembly had to be removed manually. The electrical connection between the trailer and the towing vehicle was done manually. The towing vehicle was backed up to the trailer and the operator of the towing vehicle had to align the trailer tongue socket directly onto the ball; this required considerable skill and experience.

U.S. Pat. No. 4,606,549 to Williams, Aug. 19, 1986 shows a hitch which allowed a trailer to be automatically coupled to a towing vehicle. However, in this device, manual intervention was required for uncoupling. Further, it required that the latch pin be manually reset in order to allow for recoupling. The electrical connection between the trailer and the towing vehicle was done manually. There was no accommodation for weight distributing means.

U.S. Pat. No. 4,666,177 to Vinchattle, May 19, 1987 shows a receiver system with a four-sided funnel or hopper-shaped tongue bar guide comprising top and bottom immovable plates, rigidly secured to the top and bottom edges of the housing, and movable opposed side plates, each hingedly secured to opposed sides of the housing so as to be separately movable away from and into abutment with the top and bottom plates. A spring-loaded hitch pin engaged the tongue shank which in turn engaged a locking assembly. However, manual intervention was necessary for uncoupling. The electrical connection between the trailer and the towing vehicle was done manually. This device did not allow movement of the pulled vehicle as to yaw and pitch. Also, it required a spring to operate the receiver opening, causing considerable stress on the spring mechanism while in tow. There was no accommodation for weight distributing means.

U.S. Pat. No. 4,844,497 to Allen, Jul. 4, 1989 shows a hitch with a funnel-like receiver on the towing vehicle, using a spring-urged latch pin for joining the tongue shank and receiver. Even though it does provide for a semi-automatic release, manual intervention to release the latch pin was necessary. This device did not use a conventional ball and ball mount and therefore, would require excessive manufacturing tooling as it is not compatible with current, state of the art, weight distributing apparatus. The electrical connection between the trailer and the towing vehicle was done manually.

Mathisen and Reese both offer weight distributing hitches using spring bars, draw chains, and hookup brackets; however, both of these systems, although effective and usable, have several disadvantages:

a. The head assembly, which must be removed and replaced in both these systems is bulky, awkward, and heavy.
b. The electrical connection between the two vehicles must be done manually.
c. The spring bars, while being tensioned or relaxed, are under great stress and can cause severe hand injury when the hookup handle is thrusted to the ground or when the hookup handle disengages from the chain hook of the bracket and flings upward. Utmost caution must be practiced during this procedure.
d. Separate operations are necessary in securing and releasing the trailer from the towing vehicle.

These systems require excessive time, strength, and energy.

OBJECTS AND ADVANTAGES

Accordingly, several objects and advantages of our invention are to provide an improved weight distributing trailer hitch system (one that uses draw chains and spring bars), that can be easily operated by means of automation, and which:

a) reduces physical risk to the operator;
b) facilitates faster coupling and uncoupling;
c) eliminates the need to manually set and handle draw chains;
d) eliminates the need to manually tension and release the spring bars;
e) eliminates the need to remove and replace the head assembly and spring bars;
f) reduces the possibility of equipment theft;
g) eliminates the need to store a loose, heavy head assembly and spring bars; and
h) provides an automatic electrical connection between the trailer and the towing vehicle.

The automatic coupling/uncoupling portion of our system makes for easier connecting and disconnecting of the trailer and the towing vehicle.

With our system, the tensioning of the spring bars requires no physical exertion and no physical risk. A switch is simply toggled and an electromechanical screw driven piston device automatically raises the draw chains and tensions, or releases the heavy spring bars. Because of the tension under which the spring bars are held, the releasing of these bars is potentially hazardous to the operator. Additionally, there is no need to manually set chain length or release chains as they are permanently set at a predetermined length.

In our system, the electrical connection between the trailer and towing vehicle is automatically accomplished when the two vehicles are coupled.

Our device is a boon to the physically challenged and elderly as it reduces the need of manual intervention and dexterity.

As the head, spring bar, and chain assemblies stay coupled to a standard trailer tongue in our invention, the possibility of theft and potential physical risk is practically eliminated.

Further objects and advantages will become apparent from a consideration of the ensuing description and accompanying drawings.

DRAWING FIGURES

In the drawings, capital letters (A,B,C, etc.), shown as part numbers, identify existing equipment found on a conventional trailer tongue outfitted with a weight-distributing hitch system.

FIG. 4a shows a front view of a funnel-shaped receiver, electrical plug, and solenoids, for the system of FIG. 1a.

FIG. 4b shows a front view of a funnel-shaped receiver with spring-loaded dogs engaged, for the system of FIG. 1a.

FIG. 5 shows a side view of a funnel-shaped receiver unit, indicating solenoid and plug placement, for the system of FIG. 1a.

FIG. 7 shows a sectional top view of a receiving unit, depicting placement of head assembly, spring-loaded dogs, solenoids, shank, and electrical connections, for the system of FIG. 1a.

REFERENCE CHARACTERS IN DRAWINGS

Figure 1A:
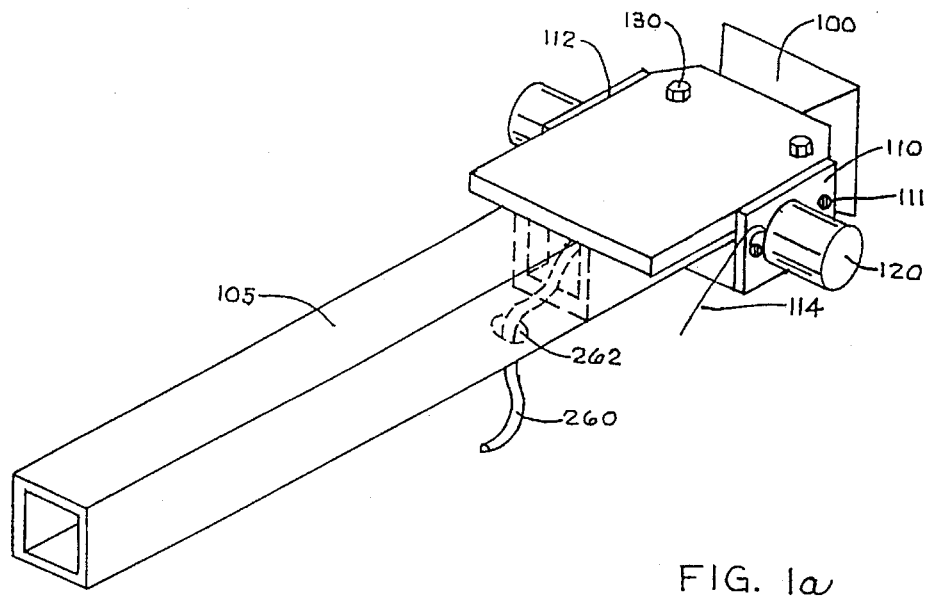
FIG. 1a shows a perspective view of a hitch receiver unit, in accordance with our invention.

A. Conventional trailer tongue with ball socket
B. Chains
C. Spring bars
D. Head assembly
E. Ball mount with ball
F. Spring bar socket
G. Leveling jack
100. Funnel-shaped receiver system
105. Receiver tube
110. Solenoid mounting plate
111. Screw
112. Gasket
114. Solenoid wires (+—)
120. Solenoid
122. Solenoid protection plate
130. Bolt and nut assembly
140. Spring-loaded dog
142. Solenoid shaft
144. Link
146. Spring
148. Spring cup 150. Spring retaining hole
152. Cut-out for dog
160. Elongated shank with tapered end
170. Tunnel
180. Male-end plug
182. Plug mounting plate
184. Screw
200. Female-end plug
210. Machined recess
220. Stop
240. Machined recess
260. Electrical cord to towing vehicle
262. Hole
280. Electrical cord to trailer
300. Cord receptacle
330. Electrical box
332. Switch
334. Electrical wiring
336. Motor
340. Extension tube
342. Body housing end mount
344. Hole
346. Bolt
348. Nut
350. Bracket
352. Nut
354. Bolt
356. Stud
358. Alignment teeth
359. Hole
360. Nut
362. Mounting bolts
364. Cam support bracket
366. Cams
368. Piston arm
370. Bolt-and-nut assembly
372. Bolt-and-nut assembly
374. Bolt-and-nut assembly
376. Spacers
378. Bushing
380. Body housing
382. Piston device

SUMMARY

In accordance with our invention, a towing vehicle is fitted with a four-cornered funnel-shaped receiver system, mounted rear centerline on the vehicle chassis. Inside the forward end of the receiver is the male end of an electrical multiterminal plug which is integrated into the towing vehicle's electrical system. At the leading end of the trailer tongue is a head assembly. A ball is mounted on the top of the head assembly and is capped by a socket. The ball is permanently coupled in the socket and permits full pivoting movement of the trailer. At the forward end of the head assembly is a slightly tapered, elongated shank. Machined recesses have been cut into both sides of the elongated shank.

Extending from the trailer's electrical system outlet is an electrical cord which is threaded through the elongated shank. At the forward end of the elongated shank is mounted a female end of the electrical multiterminal plug, to which the cord is attached. As the elongated shank enters the receiver, the towing vehicle is backed up to the proper depth, controlled by forward stops, until the female plug is joined with the male plug and the connection for all electrical functions is completed between the towing vehicle and the trailer.

Two opposing spring-loaded dogs are internally mounted laterally in the receiver. Each dog is connected to an externally mounted pull-type electromagnetic solenoid. As the elongated shank enters the receiver, the dogs are pushed aside. The compressed dog springs are released, the dogs pass through cutouts in the receiver tube, drop into the machined recesses of the elongated shank, thereby locking the elongated shank into the receiver.

Housed within the head assembly is a pair of lubricated spring bar sockets. Each socket receives the leading end of a notched spring bar which is locked in place and can rotate within the socket. The trailing end of each spring bar has a chain welded to its top side. The unsecured portion of the chain, sandwiched between two triangular cams, is suspended vertically and is fastened by means of a bolt-and-nut assembly to one corner of the triangular cams. These cams are affixed, one set to each end of an electromechanical screw driven piston device. The piston device is mounted horizontally across the trailer tongue, paralleling the trailer front. Upon activation of the piston device, tension on the spring bars is created providing proper weight distribution between the trailer and the towing vehicle.

DESCRIPTION—FIGS. 1 THROUGH 9

Figure 1:
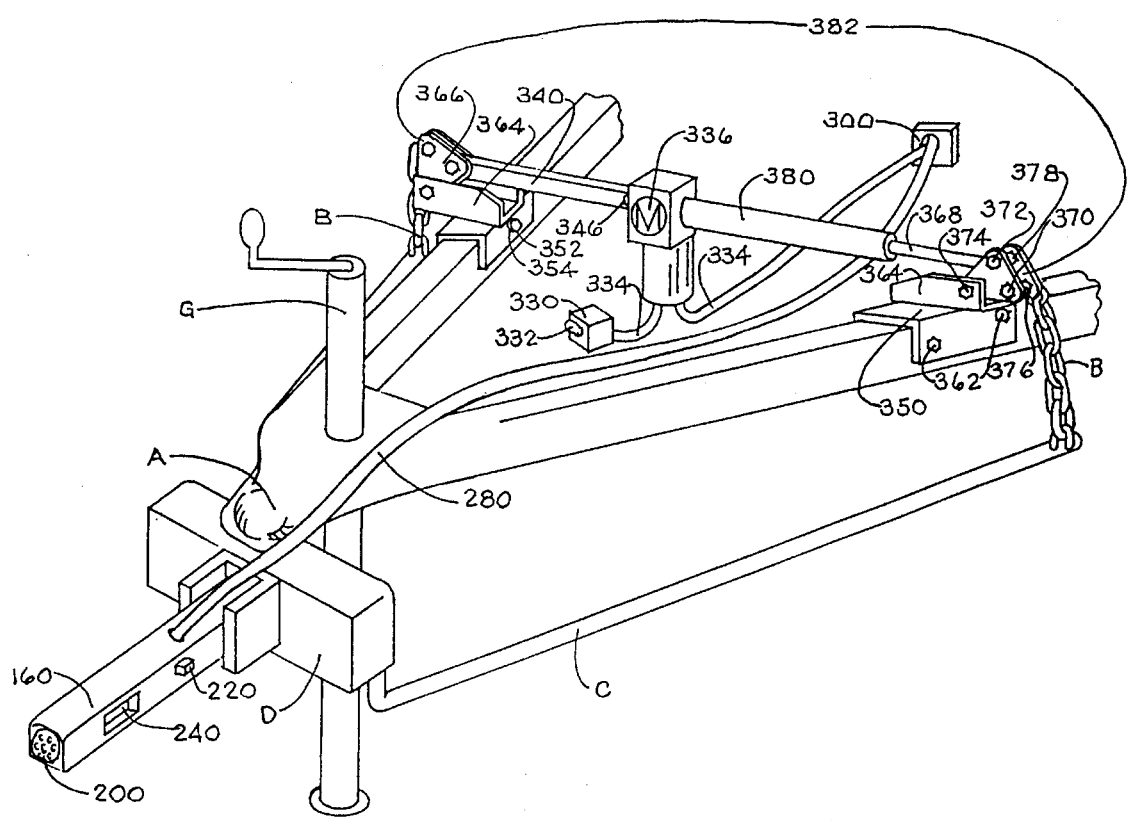
FIG. 1 shows a perspective view of a hitch system for automatic trailer coupling, in accordance with our invention.

FIGS. 1 and 1a depict an overall view of our trailer hitch system. A towing vehicle (not shown), is fitted with a four-cornered, funnel-shaped, self-aligning receiver system 100, which automatically couples a trailer (not shown), to the towing vehicle.

Figure 4A:
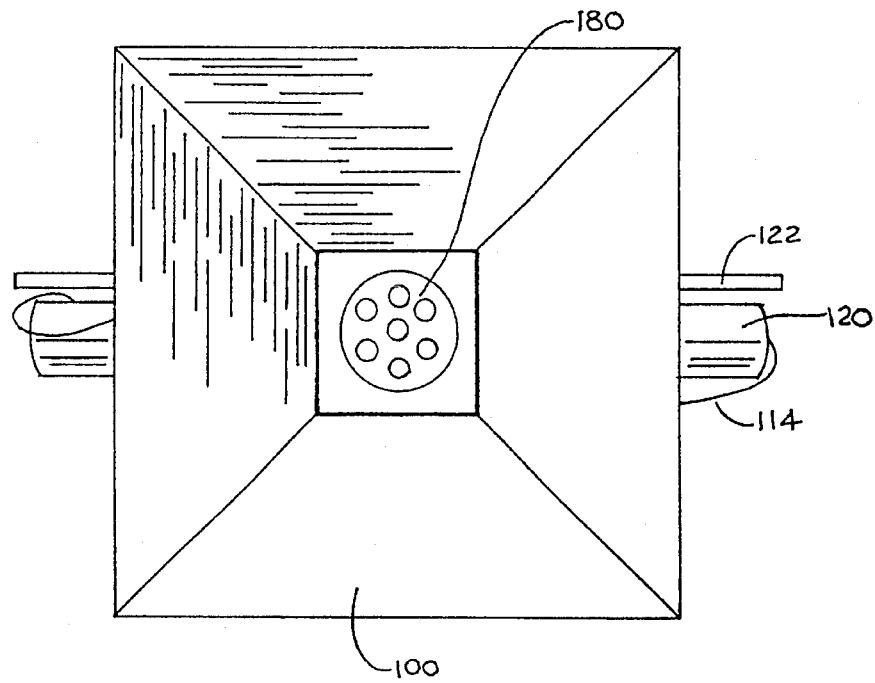
Figure 4B:
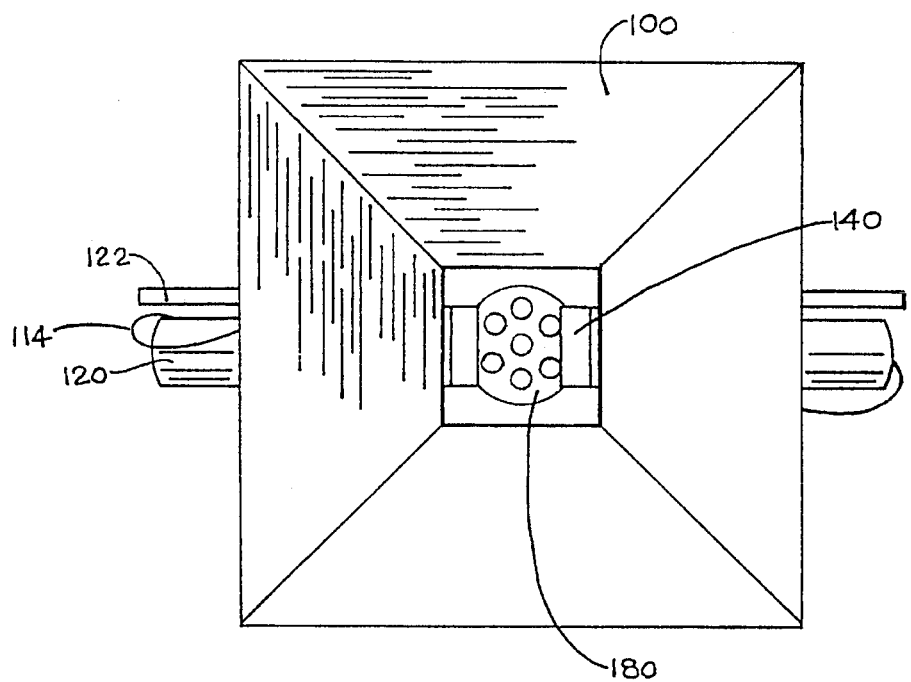
Figure 5:
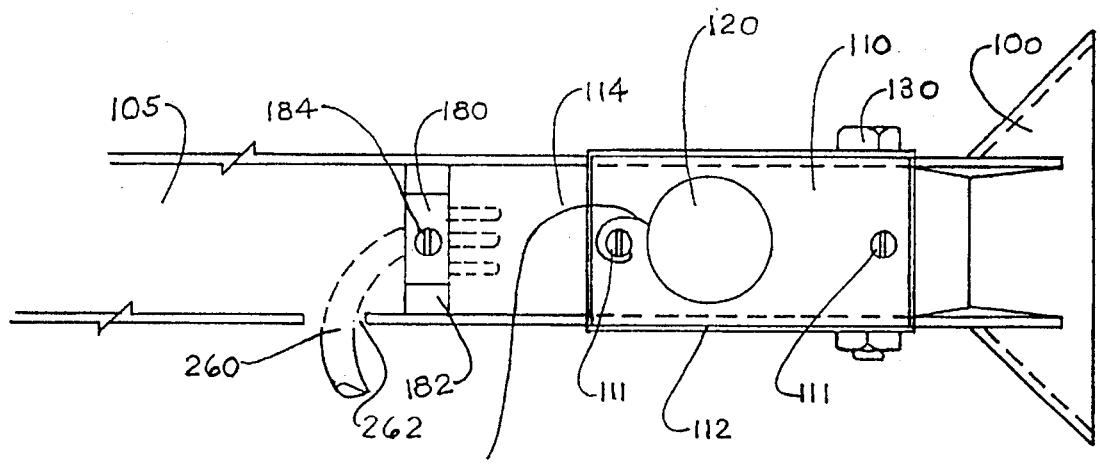
Figure 6:
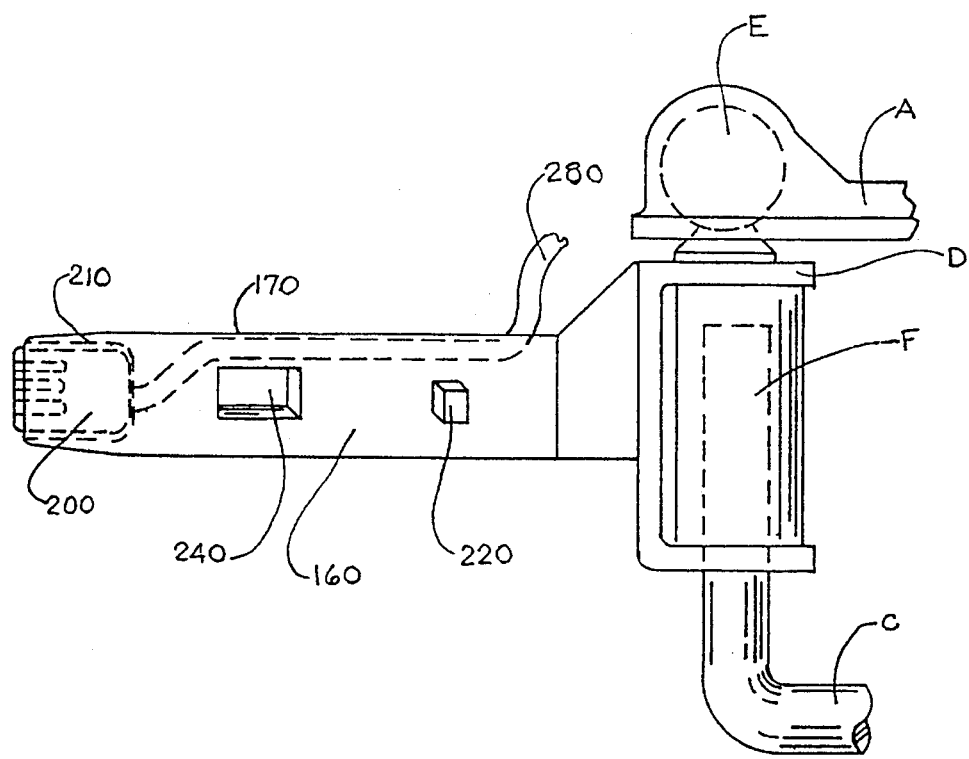
FIG. 6 shows a side view of a head assembly, depicting an elongated shank, machined recesses and stops, an electrical plug with cord, and spring bars, for the system of FIG. 1.
Figure 7:
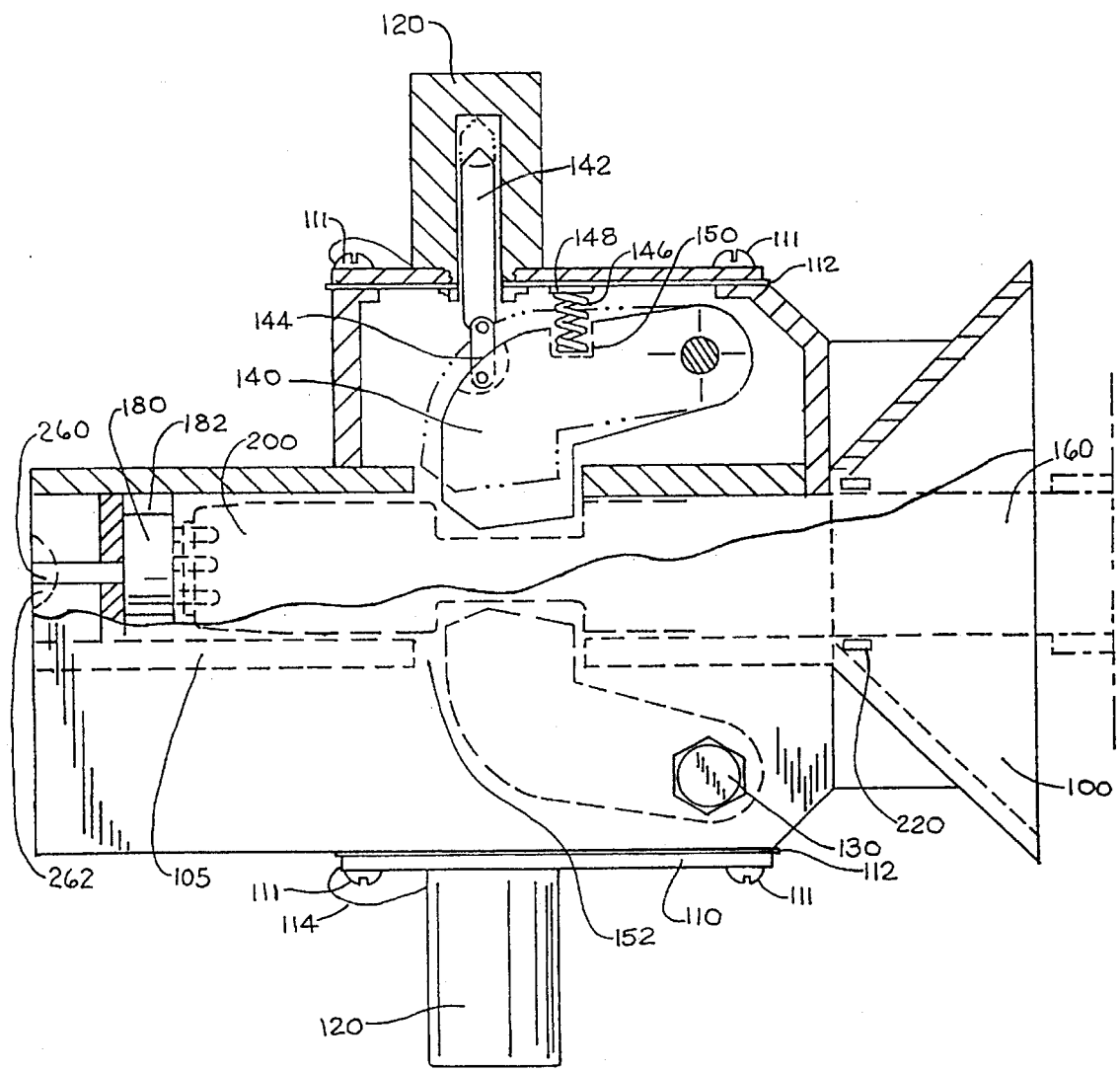

Receiver system 100 (FIGS. 1a and 7) comprises a receiver tube 105, spring loaded dogs 140, a solenoid shaft 142, a link 144, a spring 146, a spring cup 148, a spring retaining hole 150, and an electrical connection 180. Inside receiver system 100, dogs 140 are mounted laterally, one opposing the other, and are pivotally secured by bolt-and-nut assembly 130. Dogs 140 pass through cutouts 152 to secure shank 160 (FIG. 6) and are retractable by means of outside mounted electric solenoids 120 (FIGS. 1a, 4a and 4b). Solenoids 120 are mounted to receiver tube 105. Gasket 112 is placed between receiver tube 105 and plate 110 and secured by screws 111. Solenoid wires 114 are integrated into cord 260 and provide the power necessary to retract solenoids 120. A steel protection plate 122 is welded to receiver tube 105 horizontally over each solenoid 120. At the forward end of receiver tube 105 is the male end of an electric multiterminal plug 180 (FIGS. 4a and 4b). Plug 180 is set in mounting plate 182 (FIGS. 5 and 7), and secured in receiver tube 105 by screw 184. Power to receiver system 100 is supplied by cord 260. Cord 260 (FIG. 1a) exits receiver tube 105 through hole 262 and is connected to the towing vehicle's electrical system.

Mounted to a conventional trailer tongue A (FIG. 1), with leveling jack G, is a weight-distributing hitch system consisting of a head assembly D, spring bars C and chains B. Head assembly D (FIG. 6) comprises a ball mount with ball E, spring bar sockets F for spring bars C, and a forward-protruding, slightly tapered elongated shank 160. A machined recess 210 has been cut in the forward end of shank 160 and accepts the female end of an electrical multiterminal plug 200. A cord 280 (FIG. 1) is attached to female plug 200 and is threaded back through shank 160 by means of a tunnel 170 (FIG. 6), which has been drilled inside along the top side of the shank. Cord 280 (FIG. 1) exits shank 160 and plugs into the trailer's electrical system receptacle 300, providing power from the towing vehicle to the trailer. Elongated shank 160 (FIG. 6) is fitted with forward stops 220 and has machined recesses 240 cut on opposite sides to accept dogs 140. An L-shaped spring bar C with notched leading edge is locked into socket F. Chains B (FIG. 1), affixed to the trailing edge of spring bar C, are attached to rotatable, triangular cams 366 of the electromechanical screw-driven piston device 382.

Figure 2:
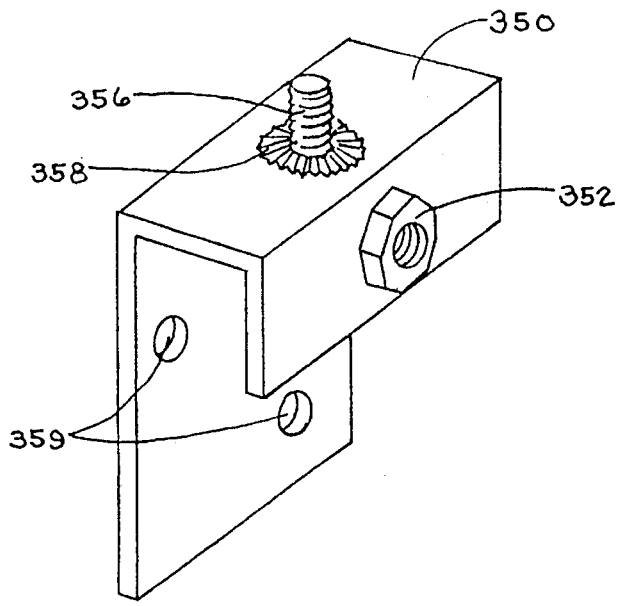
FIG. 2 shows a perspective view of a trailer tongue mounting bracket, for the system of FIG. 1.
Figure 3:
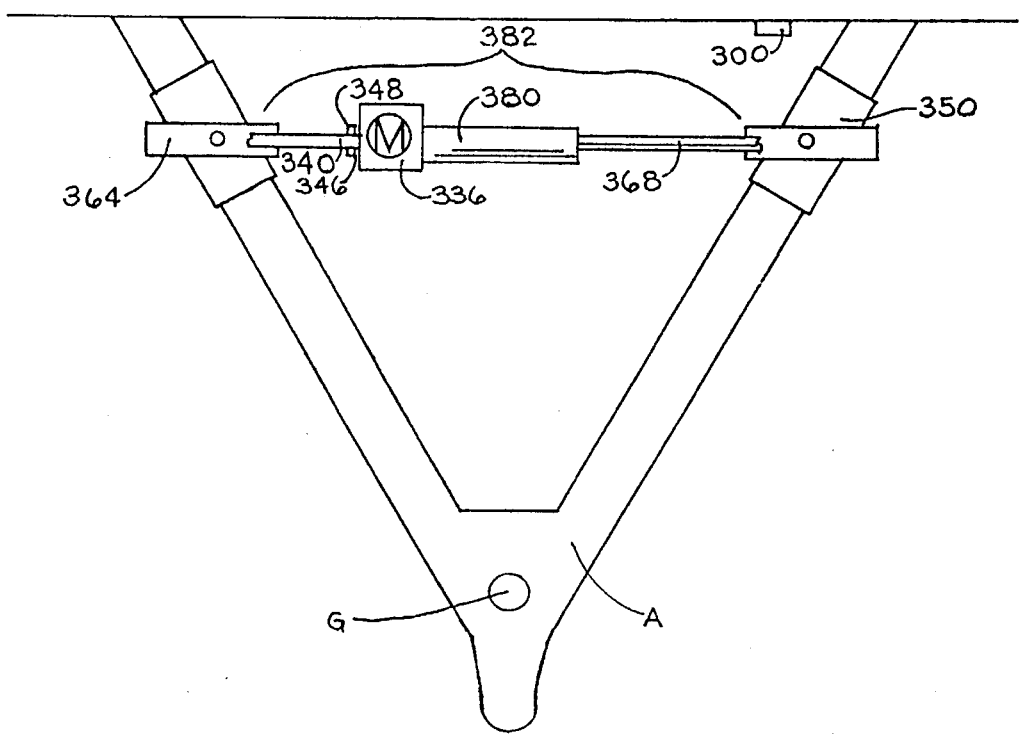
FIG. 3 shows a top view of a trailer tongue, indicating piston device placement, for the system of FIG. 1.

Shown in FIG. 3 is the electromechanical screw-driven piston device 382 mounted transversely on trailer tongue A. Piston device 382 is mounted to tongue A by means of two brackets 350 (FIG. 2). Brackets 350 are sleeved over the rearward ends of tongue A. Brackets 350 are affixed to tongue A with mounting bolts 362 (FIG. 8c) through holes 359 (FIG. 2), and are adjustable by means of alignment teeth 358 stamped into brackets 350. Brackets 350 have threaded studs 356 welded to their top sides. Welded to the innermost side of each bracket 350 is a nut 352 which accepts a tension adjusting bolt 354 (FIG. 8c) which further secures placement of brackets 350 (FIG. 3). An inverted bracket 364 (FIG. 8c), having reverse stamped alignment teeth 358 (FIG. 8c), mates with bracket 350, allowing cam support bracket 364 to align with piston device 382, and is secured in place by nut 360 (FIG. 9).

Mounted to the inside of each leg of cam support bracket 364 (FIG. 9) is triangular cam 366. Each cam 366 is mounted parallel to the other. One corner of each cam 366 (FIGS. 8a and 8b) is affixed to cam support bracket 364 by means of a bolt-and-nut assembly 374 which allows cams 366 to pivot freely and in unison on cam support brackets 364.

Figure 8A:
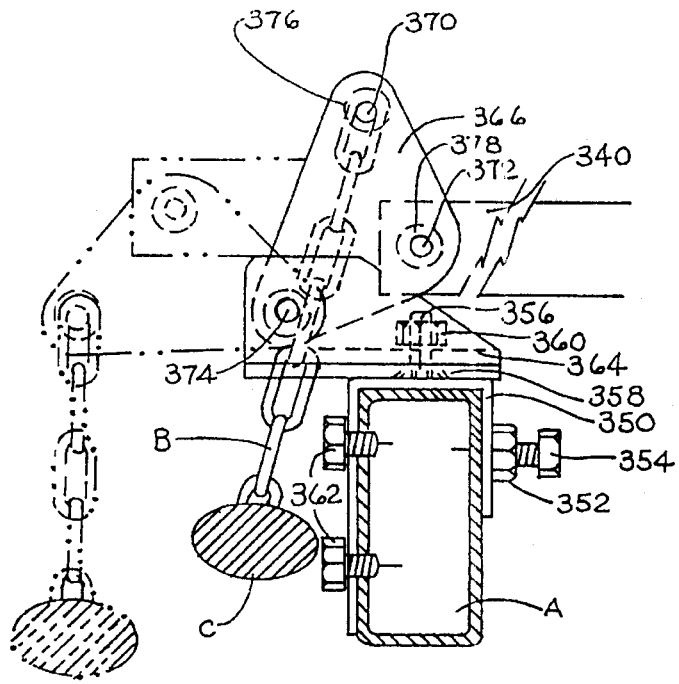
FIG. 8a shows a front, left-hand view, in both static and alternate positions, of an extension tube, triangular cams, chain assembly, cam support bracket, and mounting brackets of an electromechanical screw-driven piston device, for the system of FIG. 1.
Figure 8B:
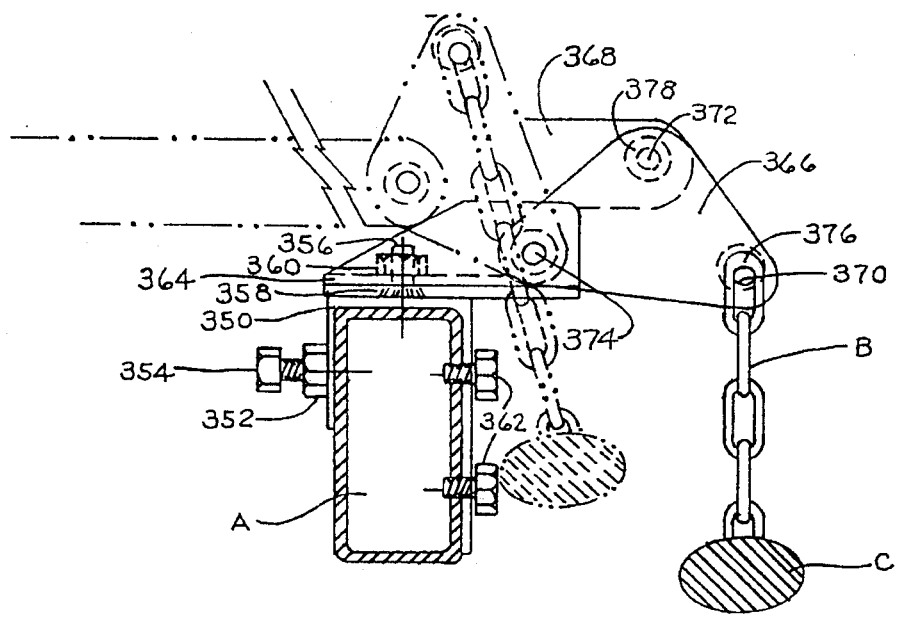
FIG. 8b shows a front, right-hand view, in both static and alternate positions, of a piston arm, triangular cams, chain assembly, cam support bracket, and mounting brackets of an electromechanical screw-driven piston device, for the system of FIG. 1.
Figure 9:
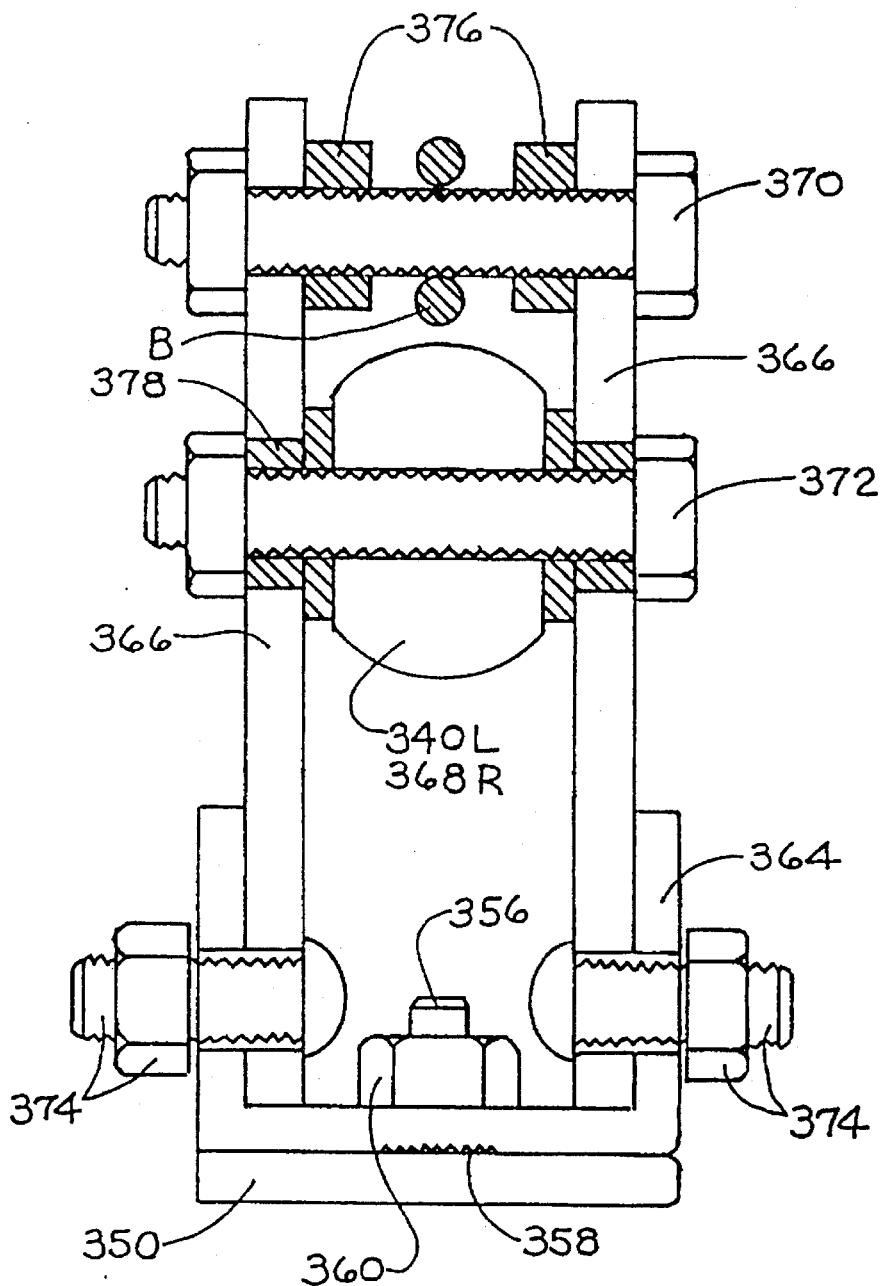
FIG. 9 shows an end view of the mounting brackets, cam support brackets, cams, extension tube, piston arm, and all related hardware for the system of FIG. 1.

Sandwiched between one set of cams 366, and attached to the second corner of the triangular cams 366, is the extended end of piston arm 368 (FIGS. 1 and 9). Piston arm 368 pivots on a bolt-and-nut assembly 372 (FIG. 8b). On each side of piston arm 368 is a bushing 378 (FIG. 8a, 8b and 9) which keeps piston device 382 aligned between cams 366.

Figure 1B:
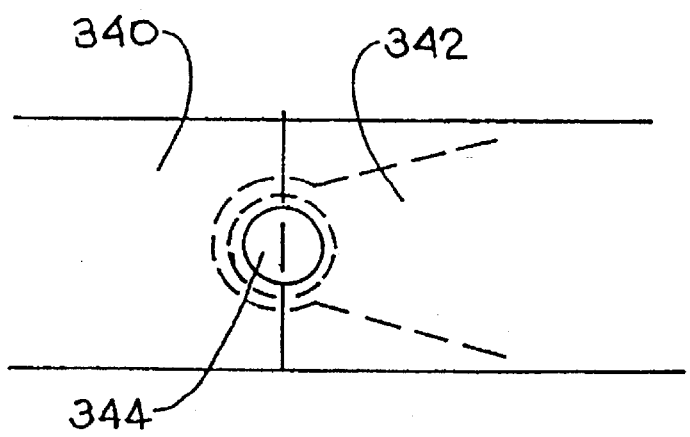
FIG. 1b and 1c show sectional views of a body housing end mount to which an extension tube is mounted, for the system of FIG. 1.
Figure 1C:
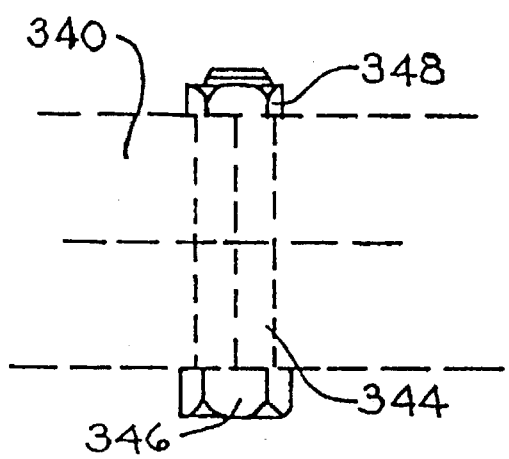

An extension tube 340 (FIGS. 1 and 1b) is attached to end mount 342 of body housing 380 through hole 344 by means of bolt 346 and nut 348.

Sandwiched between the other set of cams 366 on the opposite end of body housing 380 (FIG. 1), and attached to the second corner of triangular cams 366, is the extended end of extension tube 340. Extension tube 340 (FIG. 8a) pivots on bolt-and-nut assembly 372. On each side of extension tube 340 is a bushing 378 which keeps piston device 382 (FIG. 1) aligned between cams 366.

Fastened to the third corner of cams 366, by means of bolt-and-nut assembly 370 (FIGS. 8a, 8b and 9), are spacers 376 sandwiching the upper ends of respective chains B which are connected to known spring bars C.

A motor 336 (FIG. 1), mounted on body housing 380, supplies power to piston device 382. Motor 336 receives its current from the trailer battery (not shown), via electrical wiring 334. Motor 336 is activated by means of a switch 332 enclosed in a box 330. Box 330 is installed in the vicinity of motor 336.

OPERATION—FIGS. 1, 1a, 7, 8a, 8b

A towing vehicle is fitted with a receiver system (FIGS. 1a and 7) in accordance with our invention. A trailer is fitted with a head assembly and weight distributing hitch system (FIG. 1) in accordance with our invention.

In operation, the weight of a trailer is supported by means of a leveling jack of a conventional trailer tongue. The trailer tongue is raised or lowered as necessary to align with the receiver system of the towing vehicle. The towing vehicle is backed up toward the tongue, maneuvering as necessary in order to insure proper lateral alignment between the forward hitch extension of the trailer tongue and the funnel-shaped opening of the receiver on the towing vehicle. When proper alignment is established, the towing vehicle is backed up until the elongated shank of the trailer tongue enters the receiver tube, pushing aside the spring-loaded dogs and proceeding to the proper depth, as controlled by forward stops. When the elongated shank is locked into place by the spring action of the dogs, the electrical plugs mate and connection between the towing vehicle and the trailer is completed.

Figure 8C:
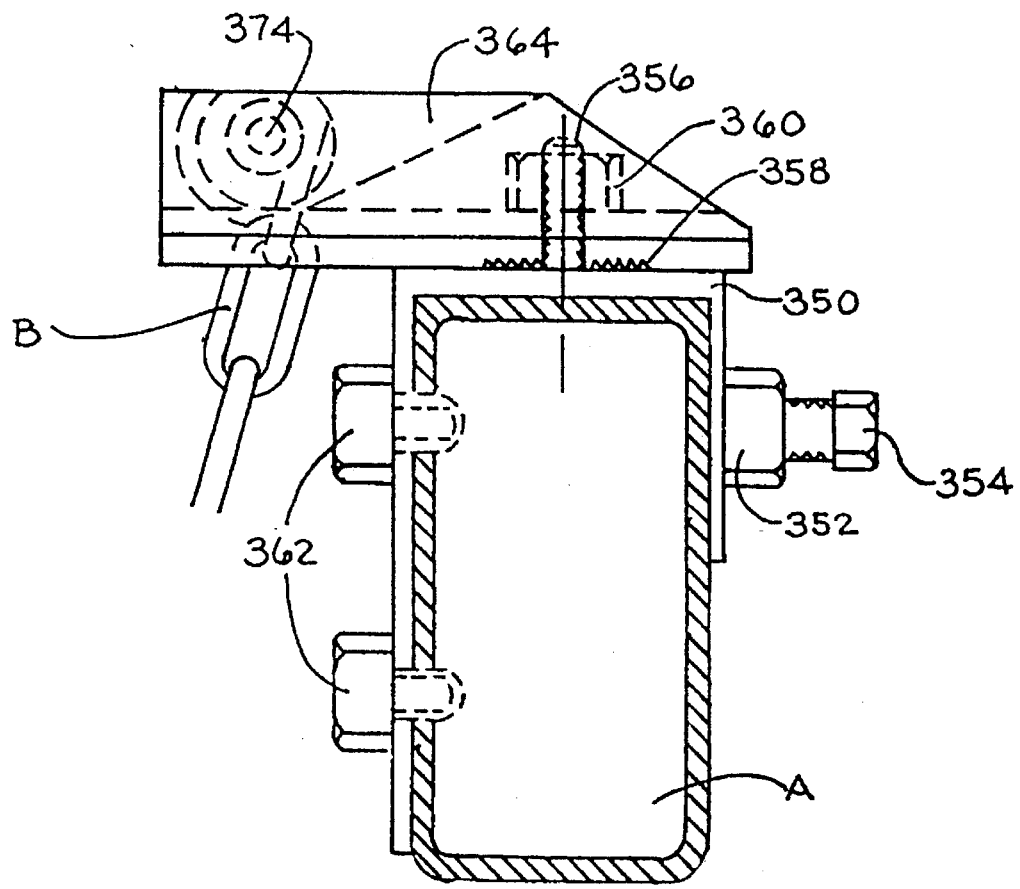
FIG. 8c shows a front, left-hand view of a mounting bracket, cam support bracket, alignment means, and cam pivot point bracket, for the system of FIG. 1.

To establish weight distribution between the two vehicles, the chain on the piston arm side is raised by toggling a switch to activate a motor which turns the screw of piston device and retracts piston arm (FIGS. 8a and 8b). As piston arm retracts, the triangular cams rotate and vertically raise the chain, creating tension on spring bar. The same action is duplicated on the extension tube side which pulls the chain upward by linear movement and creates tension on the other spring bar. When both chains have been raised and spring bars are tensioned, weight distribution has been accomplished, and switch is released.

The hitching is completed, the leveling jack is raised, and the two vehicles are safely coupled and can be moved in tandem.

To disconnect trailer from the towing vehicle, the trailer's leveling jack is lowered to support the trailer. The spring bars are released by again toggling the switch which activates and extends the screw of the piston device resulting in the downward rotation of the cams. This action lowers the chains and thereby releases the tension on the spring bars. The dogs are released by means of depressing a switch located in the towing vehicle. This switch activates the pull-type electromagnetic solenoids, withdrawing the dogs from the machined recesses, thus facilitating the removal of the elongated shank from the receiver. The electrical connection between the trailer and the towing vehicle is automatically disconnected. The towing vehicle is now free from the trailer and can move forward independently.

CONCLUSIONS, RAMIFICATIONS, AND SCOPE

The reader will see from the above that the novel trailer hitch system of our invention eliminates physical risk and exertion by automating the hitching process. Furthermore, the system has the following additional advantages:

it can be easily adapted to most existing conventional trailer tongues;
it substantially minimizes hookup and disconnect time;
it eliminates the need to manually remove chains from the hookup bracket as they are permanently set at a predetermined, yet adjustable length;
it eliminates the need to manually tension and release the spring bars;
it allows the entire hitch (head assembly, spring bars and chains) to remain attached to the trailer tongue-there are no separate, awkward, and heavy pieces to store or handle, and the possibility of equipment or trailer theft is practically eliminated;
operation is clean-there is no need to handle dirty, greasy parts so that hands and clothing stay clean;

it is a boon to the elderly and physically challenged;

it reduces possible injury to the operator;

it provides an automatic electrical connection between the trailer and the towing vehicle.

Although the description above contains many specificities, these should not be construed as limiting the scope of the invention, but merely as providing illustrations of some of the presently preferred embodiments of this invention. For example, clevis pins, rivets, bearings, and shafts can replace bolt-and-nut assemblies; various alternative shapes, sizes, and styles of activation mechanisms can be used; indicator lights could be used throughout the system to show activation of specific components; etc.

Thus, the scope of our invention should be determined by the appended claims and their legal equivalents, rather than the examples given.

We claim:

1. A weight distribution trailer hitch system, comprising:

a receiver tube adapted to be mounted to a towing vehicle;

first and second spring bars;

a head assembly including a ball hitch and an elongated shank adapted to be received in said receiver tube, said head assembly including first and second sockets for receiving respective ends of said spring bars;

first and second brackets adapted to be attached to a towed vehicle;

first and second triangular cams, each being rotatably mounted to a respective one of said first and second brackets;

first and second chains, one end of each being connected to a respective one of said first and second triangular cams, the other end of each being connected to a respective spring bar;

a piston device having first and second ends, said first end pivotally connected to said first triangular cam and said second end pivotally connected to said second triangular cam; and actuating means for moving said first and second ends of said piston device toward and away from one another.

2. The weight distribution trailer hitch system of claim 1 wherein said actuating means comprises an electric motor.

3. The weight distribution trailer hitch system of claim 1 wherein said elongated shank further comprises a female end plug connector mounted to an end thereof.

4. The weight distribution trailer hitch system of claim 1 wherein said receiver tube further comprises a make end plug connector mounted to a mounting plate within said receiver tube.

5. The weight distribution trailer hitch system of claim 1, further comprising a pair of machined recesses cut on opposite sides of said elongated shank and a pair of solenoids mounted transversely to opposite sides of said receiver tube; said solenoids driving a pair of dogs adapted to fit into said machined recesses.

* * * * *

UNITED STATES PATENT AND TRADEMARK OFFICE
CERTIFICATE OF CORRECTION

PATENT NO. : 5,580,076
DATED : 12/3/96
INVENTOR(S) : Yvonne H DeRoule and Nanette Y Poncini It is certified that error appears in the above-indentified patent and that said Letters Patent is hereby corrected as shown below:

In "abstract", line 7    word "Pear" should be "rear"

Column 4, line 59    114. Solenoid wires (+-) should be
                     114. Solenoid wires (+ -)

Column 10, line 19    word "make" should be "male"

Signed and Sealed this

Fifteenth Day of April, 1997

Attest:

BRUCE LEHMAN

*Attesting Officer*      *Commissioner of Patents and Trademarks*